C. GOEBLER.
SPINDLE AND BOWL DRIVE.
APPLICATION FILED AUG. 31, 1917.

1,293,082.

Patented Feb. 4, 1919.

WITNESS:

INVENTOR
Charles Goebler
BY
ATTORNEY.

UNITED STATES PATENT OFFICE.

CHARLES GOEBLER, OF POUGHKEEPSIE, NEW YORK, ASSIGNOR TO THE DE LAVAL SEPARATOR COMPANY, OF NEW YORK, N. Y., A CORPORATION OF NEW JERSEY.

SPINDLE AND BOWL DRIVE.

1,293,082.   Specification of Letters Patent.   Patented Feb. 4, 1919.

Application filed August 31, 1917. Serial No. 189,060.

*To all whom it may concern:*

Be it known that I, CHARLES GOEBLER, a citizen of the United States, residing at Poughkeepsie, county of Dutchess, and State of New York, have invented a new and useful Improvement in Spindle and Bowl Drives, of which the following is a full, clear, and exact description, reference being had to the accompanying drawings, which form a part of this specification.

My invention relates to driving means for the spindles and bowls of centrifugal separators and clarifiers.

The object of my invention is to provide a construction in which slight defects in manufacture will not cause bad operation.

One of the ordinary means for driving separator bowls is by a slot across the end of the spindle and a pin or dog across a socket in the bottom of the bowl. The spindles that carry the bowl in large size machines are often driven by a similar arrangement inverted. If the slot is not exactly in the center of the spindle, or if the pin or dog is not across the exact center of the socket, the members will be thrown out of line and result in a rough-running machine.

I accomplish my object by providing in the socket a dog which, while prevented from turning relative to the socket, is free to move, across the socket, through a range greater than the probable errors in manufacture of the slots in the spindles.

In the accompanying drawings, which show a preferred embodiment of my invention:—

Figure 1:
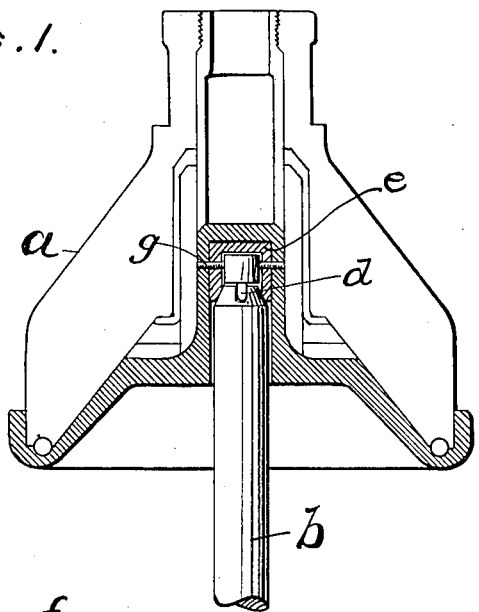
Figure 1 is a cross-section of a separator bowl having my improved driving arrangement.
Figure 2:
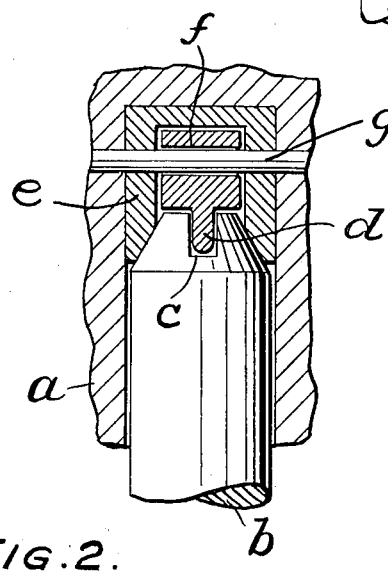
Fig. 2 is a cross section, on a larger scale, through the end of the spindle, the socket and the dog.
Figure 3:
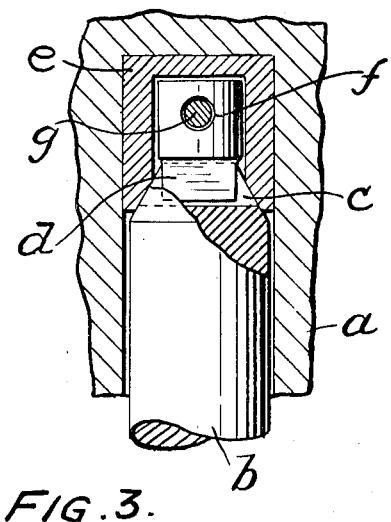
Fig. 3 is a cross section at right angles to Fig. 2.

The separator bowl $a$ is supported and driven by the spindle $b$. In the upper end of the spindle is a cross notch $c$ in which fits loosely a driving dog $d$. The shank of the driving dog is smaller than the hole for it in the socket member $e$, and has a hole $f$ of a size appreciably larger than the pin $g$ which passes through it and fits tightly in the socket member. The socket member is, for convenience of manufacture, made separate from the bowl, but is fastened so as to be practically integral with it. In the case illustrated the end of the spindle and the socket in which it fits are both tapered at an angle of about 30° with the center line, although this shape is non-essential.

It is readily seen that because the shank of the dog $d$ is smaller than its hole in the socket member $e$ and fits loosely on the pin $g$, the dog $d$ can move freely along the pin until the center is in line with the center of the notch $c$ even when the notch $c$ is not in the center of the spindle $b$. This allows the socket to fit properly on the taper end of the spindle and brings the axis of the bowl into alinement with the axis of the spindle.

Having now fully described my invention, what I desire to claim and protect by Letters Patent is:

1. In a mechanical drive, the combination with two members one having a socket and the other an end in guiding relation with the socket, of a dog within the socket of the first member and attached to said end of the second member so as to effect the rotation of one by the other, and means providing a relative movement of the dog within the socket transversely to the axes of rotation of said members.

2. In a mechanical drive, the combination with two members one having a socket and the other an end in guiding relation with the socket, of a dog within the socket having a shank engaging a cross-notch in said end, said dog being movable within the socket in a direction transverse to the direction of extension of the cross-notch.

3. In a mechanical drive, the combination with two members one having a socket and the other an end in guiding relation with the socket, of a dog within the socket of the first member and attached to said end of the second member so as to effect the rotation of one by the other, and a cross-pin in the socket along which said dog has a limited sliding movement without effecting the driving engagement between the two members.

4. In a mechanical drive, the combination with two members, one having a male and the other a female form adapted for alinement of one member with the other, the male member having a cross-notch in its end, of a dog having a tongue engaging said notch and attached to the female member so as to be both turnable therewith and movable relatively thereto at right angles to the length of its tongue.

5. In a mechanical drive, the combination with two members, one having a male and the other a female form adapted for alinement of one member with the other, the male member having a cross-notch in its end, of a dog having a tongue engaging said notch and fitting loosely within said female member, and a pin secured to the female member and extending loosely through the dog at right angles to the direction of extension of said notch, the dog having a limited movement within the socket along said pin.

6. In a mechanical drive, the combination with two members one having a socket and the other an end in guiding relation with the socket, of a dog within the socket having a cross hole, a pin extending across the socket and through the hole and of smaller diameter than the hole, the dog having a limited sliding movement along the pin within the socket, and a tongue on the dog extending at right angles to said hole and fitting loosely within a cross-notch in the end of the second member.

7. In a mechanical drive, the combination with two members, one a spindle having a tapered end and the other having a socket with an internally tapered mouth adapted to the tapered end of the spindle to hold the two members in guiding relation, of a dog within the socket and attached to the end of the spindle so as to effect the rotation of one by the other, and means providing a relative movement of the dog within the socket transversely to the axis of rotation of said members.

8. In a mechanical drive, the combination with two members, one a spindle having a tapered end and the other having a socket with an internally tapered mouth adapted to the tapered end of the spindle to hold the two members in guiding relation, of a dog within the socket having a cross hole, a pin extending across the socket and through the hole and of smaller diameter than the hole, the dog having a limited sliding movement along the pin within the socket, and a tongue on the dog extending at right angles to said hole and fitting loosely within a cross-notch in the end of the spindle.

9. In a mechanical drive, the combination with a driving member and a driven member, one member having a socket, of a dog within the socket in driving engagement with the other member but having a limited movement relatively thereto along a line radial to the axis of rotation of said members, said dog also being in driving engagement with the socketed member but having a limited movement relatively thereto along a line radial to said axis at a right angle to the first named line.

In testimony of which invention, I have hereunto set my hand, at Poughkeepsie, N. Y., on this 24th day of August, 1917.

CHAS. GOEBLER.